United States Patent [19]

Borzym

[11] Patent Number: 5,191,822
[45] Date of Patent: Mar. 9, 1993

[54] ADJUSTABLE CLAMP JAWS

[76] Inventor: John J. Borzym, 4820 School Bell La., Birmingham, Mich. 48010

[21] Appl. No.: 792,711

[22] Filed: Nov. 15, 1991

Related U.S. Application Data

[63] Continuation-in-part of Ser. No. 661,504, Feb. 26, 1991.

[51] Int. Cl.$^5$ .......................... B26D 7/02; B25B 1/24
[52] U.S. Cl. ........................................ 83/466; 83/319; 83/454; 83/700; 269/87.2; 269/164
[58] Field of Search .................. 269/87.2, 164, 224; 83/319, 320, 321, 454, 456, 466, 700; 52/704, 705; 411/107; 29/559

[56] References Cited

U.S. PATENT DOCUMENTS

| | | | |
|---|---|---|---|
| 245,720 | 8/1881 | Hendry | 269/164 |
| 726,070 | 4/1903 | Keen | 52/705 |
| 800,604 | 9/1905 | Anderson | 269/164 |
| 1,067,902 | 7/1913 | Ebert | 269/164 |
| 2,587,923 | 3/1952 | Sulger . | |
| 2,680,395 | 6/1954 | Christiansen | 269/164 |
| 2,896,712 | 7/1959 | Brenner et al. | 83/700 |
| 3,837,633 | 9/1974 | Paulsen . | |
| 3,964,665 | 6/1976 | Cervenka et al. . | |
| 4,082,017 | 4/1978 | Eckel . | |
| 4,290,304 | 9/1981 | Eckel . | |
| 4,404,876 | 9/1983 | Eckel . | |
| 4,437,374 | 3/1984 | Borzym | 83/454 |
| 4,475,329 | 10/1984 | Fischer | 52/704 |
| 4,475,425 | 10/1984 | Punater et al. | 83/674 |
| 4,656,806 | 4/1987 | Liebhard et al. | 52/704 |
| 4,739,682 | 4/1988 | Birkestrand . | |
| 4,798,371 | 1/1989 | Wallisser . | |
| 4,909,110 | 3/1990 | Borzym . | |
| 4,951,932 | 8/1990 | Thomas . | |

Primary Examiner—Hien H. Phan
Attorney, Agent, or Firm—Dykema Gossett

[57] ABSTRACT

An improved clamp structure is disclosed in which a replacable liner element is mounted on a mount body. The liner element is accurately longitudinally positioned relative to the mount body such that the liner can be positioned in any one of a plurality of desired locations. This is particularly valuable if the clamp is utilized in combination with a cutting machine, wherein the cutting is performed adjacent an end face of the liner and it is desired to maintain a proper clearance between the end face of the liner and the cutting element. Several embodiments are disclosed, with a first embodiment including serrated teeth which allow the liner to be incrementally advanced on the mount body. In subsequent embodiments, a threaded member is turned relative to the mount body to change the position of the liner. Finally, a set-up rig is disclosed where the liner is positioned at a location remote from a cutting machine such that a skilled technician can ensure that the liner is properly positioned. The properly positioned liner is then moved to a work location where it is fitted onto the actual cutting machine for use.

17 Claims, 7 Drawing Sheets

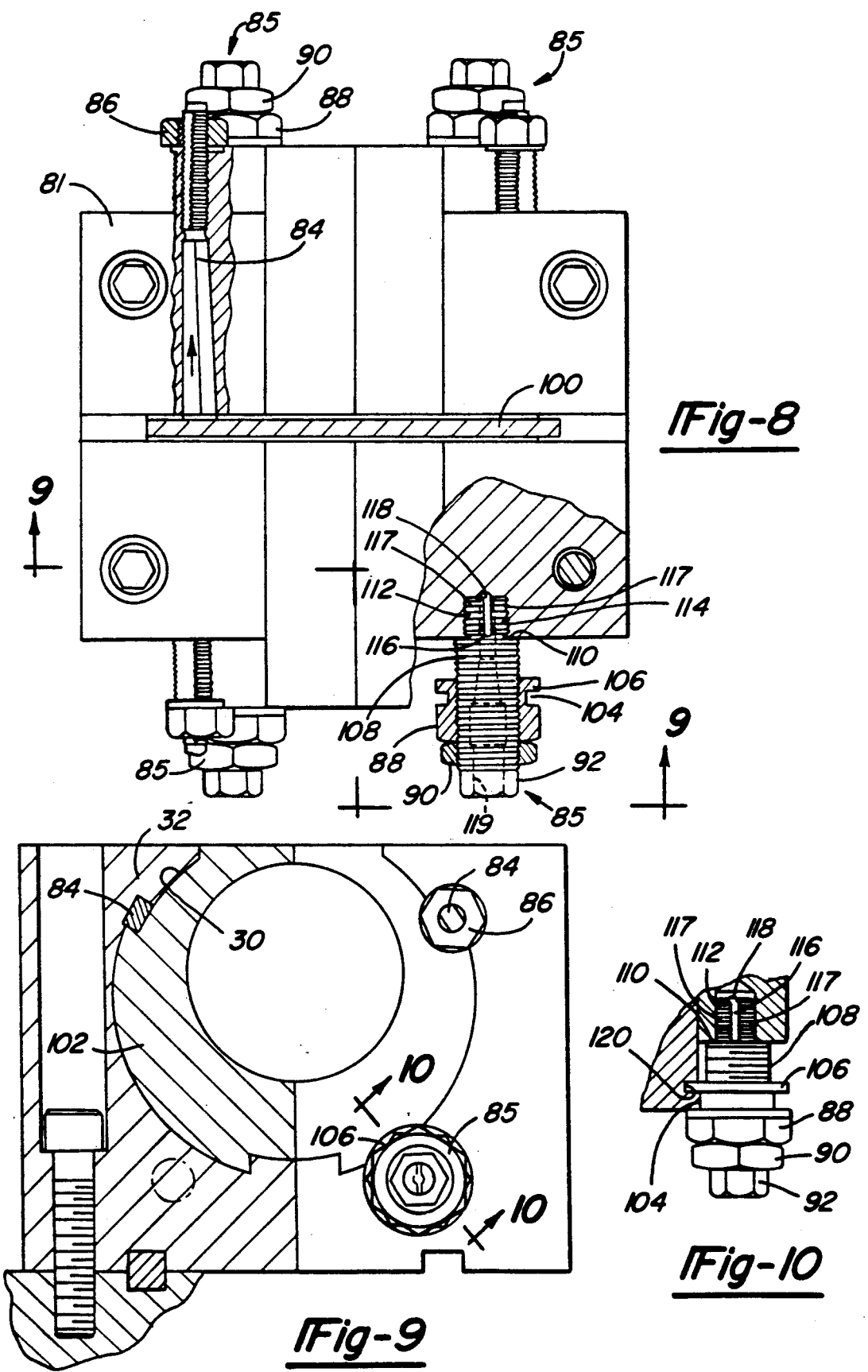

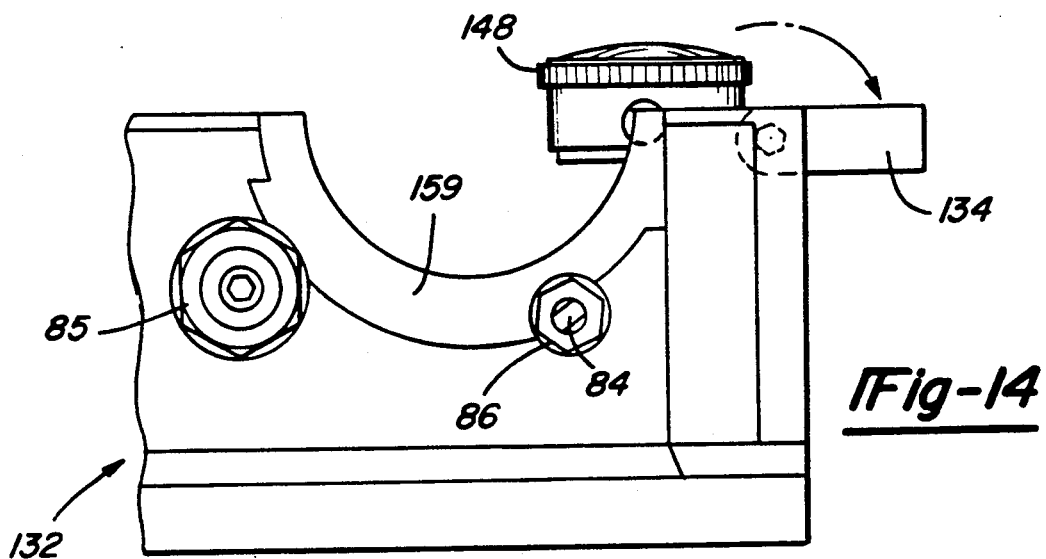
*Fig-14*
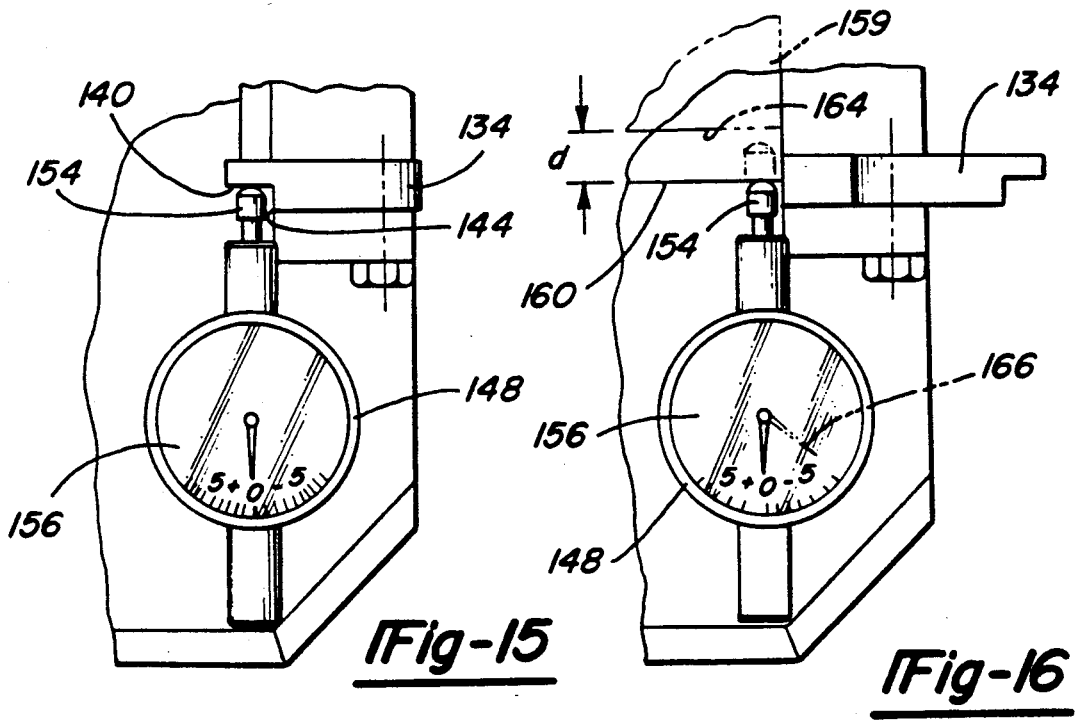
*Fig-15*  *Fig-16*
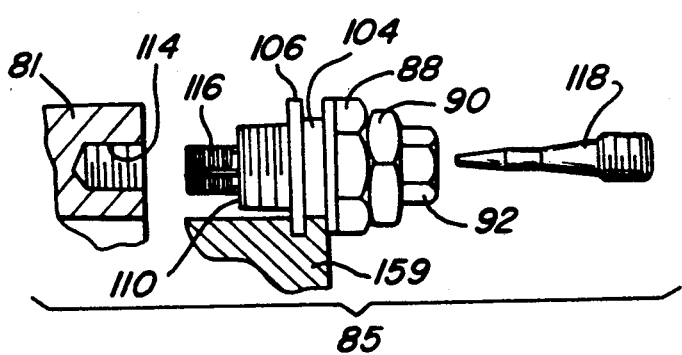
*Fig-17*

ADJUSTABLE CLAMP JAWS

BACKGROUND OF THE INVENTION

This application is a continuation-in-part of U.S. patent application Ser. no. 07/661,504, filed Feb. 26, 1991. The present application relates to improved clamping arrangements, and more particularly to a clamp jaw which is quickly and accurately positioned.

Clamping arrangements as typically used in modern industrial machines having several drawbacks. The clamps typically include jaws which engage and grip a part for machining. These clamp jaws wear and eventually must be replaced. It has previously been necessary to utilize a different type of clamp jaw for each clamp manufactured by each clamp manufacturer.

Further, the end surface of the jaws may eventually wear and the jaws must be replaced. The prior art clamp jaws include both structure for mounting the clamp jaw to a cutting machine, and the clamp surfaces, both of which must be replaced. This is undesirable since the mounting portion is typically not worn. A large quantity of otherwise useful material is thus wasted, as is the expense of manufacturing that portion.

To clamp various diameters of tubing with prior art clamps, one needed to stock a number of different diameter clamp jaws. The range of tubing diameters a particular cutting apparatus could handle was also limited due to the number of available diameters of clamp jaws adapted to fit onto the particular apparatus.

It is also complicated or difficult to accurately position the prior art clamp jaws used with a cutting element, such as a guillotine blade as typically used in common types of cutting apparatus. The prior art recognizes that the clamp jaw must be accurately positioned relative to the cutting element such that the clamp jaw provides both adequate support to a workpiece in the area of the cut, while still providing sufficient clearance to allow the blade to cut cleanly through the workpiece. If the clamp jaws are too far removed from the blade, the workpiece may bend downwardly away from the blade due to inadequate support. On the other hand, if the clamp jaws are too close to the blade, there may be insufficient clearance for the blade to cut cleanly through the workpiece. Although described with reference to cutting apparatus, this problem exists with any type of machining done adjacent one longitudinal end of a clamp.

The problem of accurately positioning clamp jaws is complicated by the fact that users of cutting apparatus often resurface or grind the longitudinal ends of the clamp jaws as they become worn. The clamp jaw ends are resurfaced such that they have sharp edges at the longitudinal ends, and it then becomes necessary to reposition the clamp jaws. The prior art has experienced difficulty in accurately repositioning the clamp jaws on the cutting apparatus.

Also, in a typical industrial environment, a worker on a cutting apparatus is under time pressures when the machine is stopped for repositioning a clamp jaw. Thus, the clamp jaw is often not accurately positioned relative to the cutting element due to time demands in the industrial environment.

Because of the above-discussed problems, the maintenance of clamp jaws in the prior art has been difficult. It is important for the proper functioning of a cutting apparatus that clamp jaws have a sharp end surface, however, it has been difficult for operators to maintain the clamp jaw ends in proper condition, and at the same time to accurately position them.

SUMMARY OF THE INVENTION

It is an object of the present invention to disclose a replaceable clamp jaw system which may be utilized across a range of different manufacturer's cutting apparatus. Further, it is an object of the present invention to disclose a clamp jaw which may be quickly and accurately positioned relative to a cutting blade. Finally, it is an object of the present invention to disclose a system and method for accurately positioning the clamp jaw relative to a cutting element in a location removed from the industrial environment.

In one aspect of the present invention, a clamp jaw consists of a mount portion which receives a replaceable liner member. A plurality of mount portions are designed, each of which correspond to the mounting structure on a particular type of clamp. The connection between the liner and the plurality of different mount portions is universal, such that a single liner may be utilized across the various mount portions. Different diameter liners may also be used with a single mount portion. This reduces the amount of replacement liners that must be manufactured and stocked. Also, when the liner becomes worn, only the liner need be replaced.

In a first disclosed embodiment, the liner has a notch at a rear surface and the mount portion has a notch at a forward surface. A positioning element is inserted into the notch of both the liner and mount portion to mount the liner at a desired position. More preferably, the positioning element has a first member with a plurality of serrations inserted into the notch in the mount element, and a second member having a plurality of serrations which mate with selected one of the serrations on the first member to lock the liner at a desired position relative to the mount portion. The relative positions of the first and second member are adjustable to adjust the relative longitudinal positions of the liner and mount portion.

More preferably, the liner also has a groove which receives a corresponding flange from the mount portion to further secure the liner, and prevent relative rotation between the two. The flange preferably extends for a circumferential distance which is less than the extent of the groove, leaving a clearance. A wedge-like locking member is inserted into the clearance between the flange and the groove to lock the liner against movement relative to the mount portion.

Most preferably, in the first embodiment, a nut is placed on an end of the wedge, and the wedge is forced inwardly until resistance to further inward movement indicates that the wedge is tightly received within the groove. The nut is then loosened several turns to provide a clearance between the nut and an end face of the liner. A force is then applied to force the wedge further inwardly of the notch. This insures that the wedge is tightly received within the groove, such that it locks the liner relative to the mount portion.

In a second embodiment of the present invention, an adjustment bolt is received in a bore in the mount portion, and has a radially outer portion received in a channel in the liner. The bolt is turned within the bore in the mount portion, and causes the liner to move longitudinally relative to the mount portion. This embodiment also preferably has a wedge-like locking member, with the wedge having threads at a first end face of the liner adjacent to the adjustment bolt. A nut is placed on the wedge and is turned to draw the wedge towards the first end face of the liner. The wedge has a cross-sectional area adjacent the first end face which is less than a cross-sectional area adjacent the opposed longitudinal end. Thus, the wedge is drawn to tightly wedge into the groove, and lock the liner to the mount portion.

In a third embodiment of the present invention, a threaded stud is mounted in a bore in the mount portion, and a nut is positioned on the thread. The nut has an outer peripheral surface which is received in a channel in the liner, and the nut is advanced on the threaded stud to move the liner longitudinally. More preferably, the nut is moved until the liner is at a desired position, and a lock nut is moved onto the stud to lock the nut and the liner at the desired position. Most preferably, the stud preferably has a central bore, and an inner portion of the stud has a pair of circumferentially-spaced portions which are threaded into the mount portion. An expander member is inserted into the central bore in the stud, and turned to force the circumferentially-spaced portions of the stud radially outwardly to lock the stud within the mount portion.

In a method of incrementally positioning a liner utilizing the second and third embodiments, a reference point, such as a cutting blade, is positioned adjacent one longitudinal end of the liner. The threaded bolt or nut is turned relative to the mount portion to move the liner until it contacts the blade. The threaded member may then be reversed to move the liner away from the blade until a predetermined clearance is achieved. In this way, the threaded member allow the liner to be accurately positioned relative to the blade.

In a further feature of the present invention, a test set-up rig is disclosed which allows the liners to be accurately positioned in a location remote from the work environment. In that location a skilled technician who may not be under the time pressures encountered in the work environment sets up the third embodiment bolt. The set-up rig approximates the cutting apparatus with which the liner is to be used. The nut and stud are used to position the liner on the set-up rig, and the stud and nut are removed as a unit and moved to the work environment where they are used to lock the liner at the predetermined position on the actual cutting apparatus. In this way, a technician in a location remote from the work environment properly positions the liner, rather than a workman in the actual work environment, and the liner is properly positioned.

In a preferred set-up rig, a gauge is utilized in combination with a model of the cutting blade for the particular tool. The gauge is zeroed at a location which approximates the end face of the cutting blade, and the liner is brought into contact with the gauge element until the gauge reads zero. This defines a position for the liner which is in abutting relationship with the blade edge. The liner is then moved away from the gauge until the gauge indicates that the end of the blade and the liner end face are spaced by a desired clearance. The threaded member for positioning the liner is then removed from the set-up rig, and moved to the tool. The threaded element is used to reposition the liner at the same position where it had been positioned on the set-up rig.

In a further feature of the present invention, the movement of the threaded member may be controlled automatically. With this feature, the automatic movement of the liner may be at a position remote from the work area, or may occur directly on the tool.

These and other objects and features the present invention can be best understood from the following specification and drawings, of which the following is a brief description.

BRIEF DESCRIPTION OF THE DRAWINGS

FIG. 8 is a top view of a third embodiment of the present invention.

FIG. 9 is a cross-sectional view along line 9—9 as shown in FIG. 8.

FIG. 10 is a cross-sectional view along line 10—10 as shown in FIG. 9.

FIG. 14 is a side view of a portion of the set-up rig shown in FIG. 13.

FIG. 15 is a top view of a portion of the set-up rig shown in FIG. 14.

FIG. 16 is a view similar to FIG. 15.

FIG. 17 is an enlarged view of a portion of the set-up rig shown in FIG. 13.

DETAILED DESCRIPTION OF PREFERRED EMBODIMENTS

Figure 1:
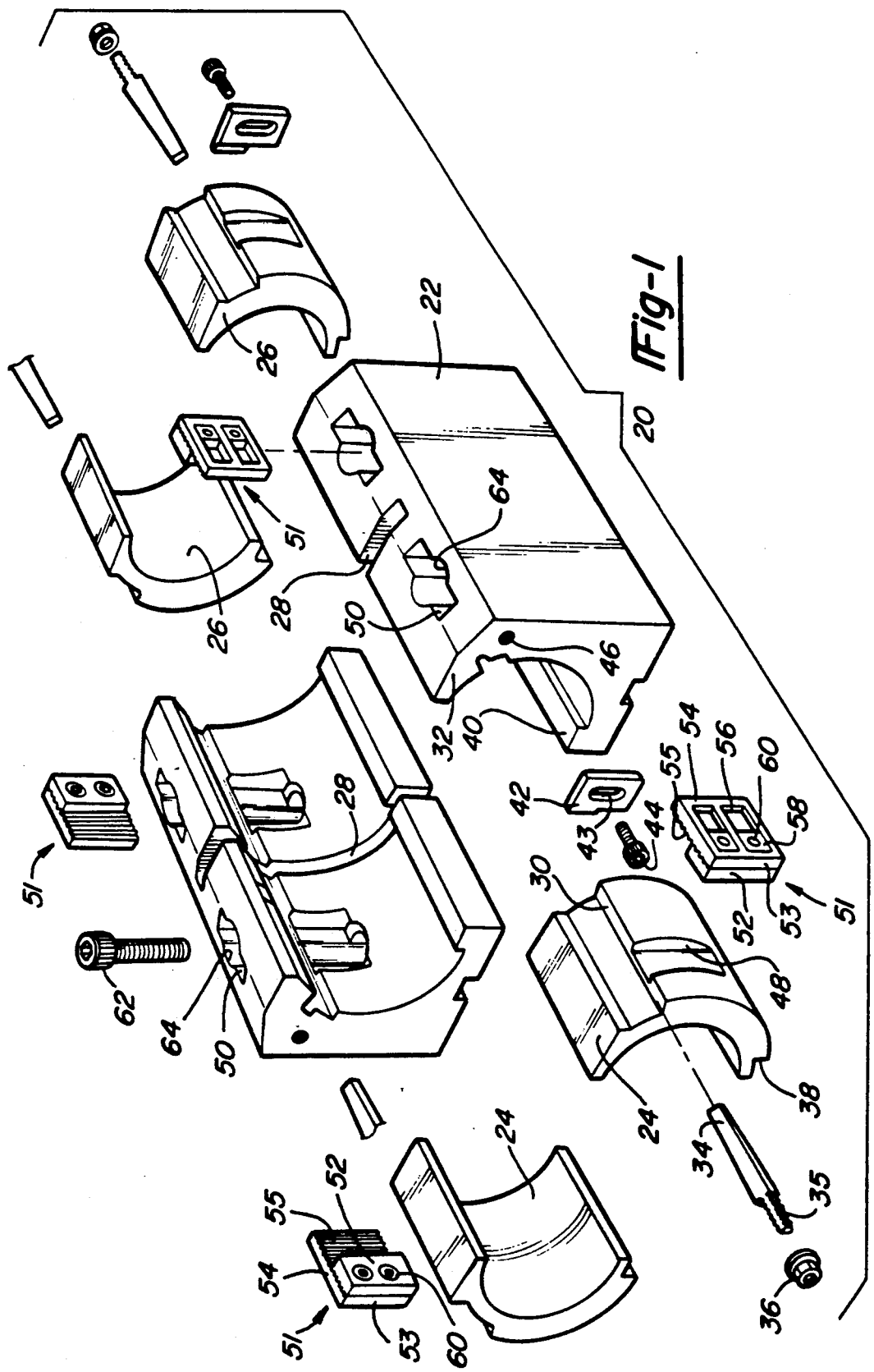
FIG. 1 is an exploded view of a first embodiment clamp according to the present invention.

A clamp system 20 is illustrated in FIG. 1 comprising a pair of opposed mount portions 22. Each mount portion 22 mounts a pair of longitudinally spaced liners 24 and 26. A central slot 28 between liners 24 and 26 accommodates a cutting element such as a guillotine blade for a tube cutting apparatus.

This invention allows liners 24 and 26 to be properly spaced relative to slot 28 such that a desired clearance exists between the longitudinal ends of liners 24 and 26 and a cutting blade. To this end, liners 24 and 26 are formed with grooves 30 at a rear face, and mount portions 22 are formed with flanges 32 extending from a forward face. As will be explained below, flanges 32 extend for a smaller circumferential extent than grooves 30, leaving a clearance. A wedge-shaped locking element 34 is positioned in the clearance to lock liners 24 and 26 within mount portions 22. A threaded outer end 35 of wedge 34 receives a nut 36, which allows wedge 34 to be forced into groove 30 to take up any clearance between flange 32 and groove 30, and to lock the liners 24 and 26 within mount portion 22. A second groove 38 in the liners rests on a flange 40 formed on mount portions 22. The combination of flanges 32 and 40 received in grooves 30 and 38, respectively, along with wedges 34, prevent any relative rotation of liners 24 and 26 relative to mount portions 22.

A locking plate 42 locks wedge 34 within notch 30. Locking plate 42 has a slot 43 which receives a bolt 44 extending into bore 46 in an end of mount portion 22. When a blade extends into slot 28 to cut a workpiece received between opposed liners 24 and 26, forces are directed longitudinally into liners 24 and 26. These forces tend to force wedges 34 and outwardly of grooves 30. Plate 42 prevents outward movement of nut 36 and wedge 34.

In order to properly longitudinally position liners 24 and 26 relative to mount portion 22, notches 48 are formed at a rear face of the liners. Corresponding notches 50 are formed within mount portions 22. A positioning element 51 is formed of a first member 52 of a first longitudinal extent received within notch 48, and having serrated teeth 53 at a rearwardly facing face. A second member 54 is received within notch 50, and has teeth 55 mating with teeth 53. Member 52 is positioned at any one of a number of locations relative to member 54 with teeth 53 engaging selected teeth 55. Member 52 is then inserted into notch 48, with member 54 inserted into notch 50. In this way, positioning element 51 locks liners 24 and 26 at a desired longitudinal position relative to mount portion 22.

Members 52 and 54 are positioned such that the liner will be in a desired position relative to mount portion 22. In order to allow member 52 to be mounted at any one of a number of locations along member 54, slots 56 are formed through member 54. Bolts 60 are received in slides 58, which are slidably mounted in slots 56. Bolts 60 are tightened to secure member 52 at any location along member 53. The serrated teeth thus allow the incremental longitudinal advancement of liners 24 and 26 relative to mount 22.

A bolt 62 is shown which may be inserted in a cylindrical opening 64 in notch 50 to secure mount portion 22 to a particular cutting machine. This structure is varied such that different mount portions 22 conform to other machines. These distinct mount portions 22 all mount identical liners 24, 26.

Figure 2:
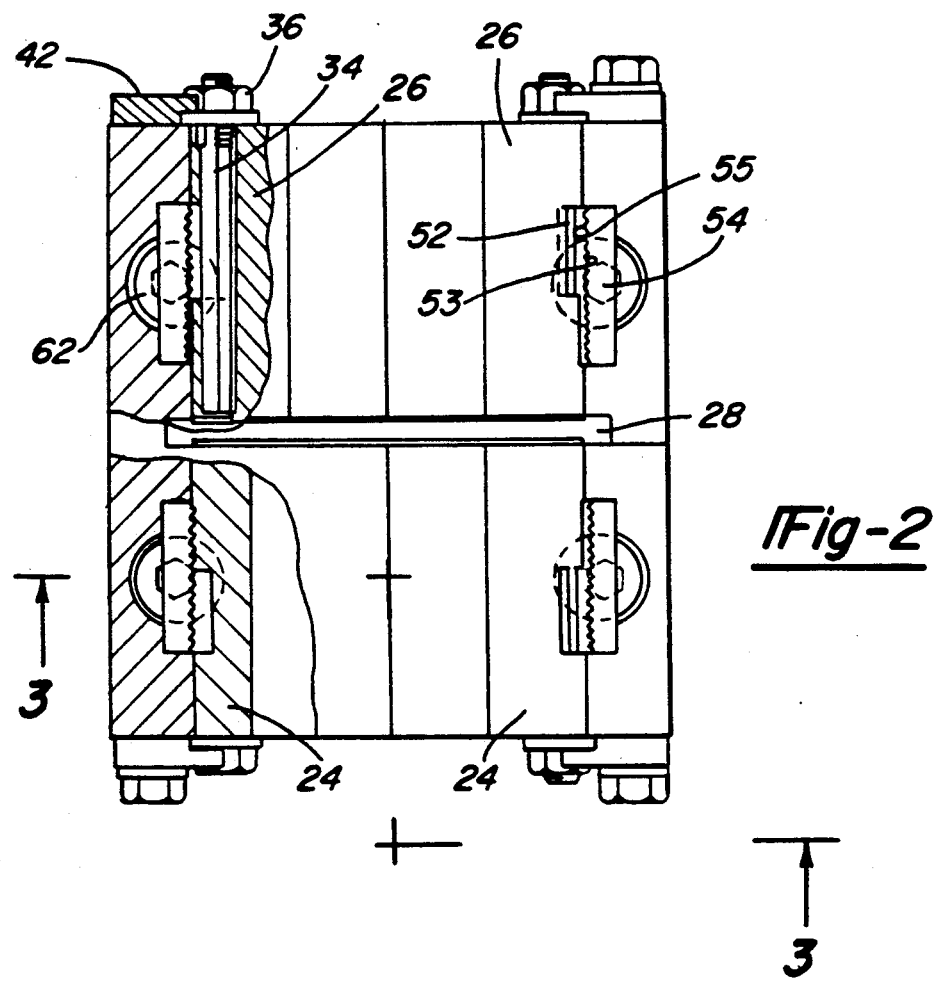
FIG. 2 is the top view of the first embodiment.

As shown in FIG. 2, liners 24 and 26 may be advanced towards, and away from, slot 28. Members 52 and 54 are received within respective notches 48 and 50 to achieve a desired longitudinal position for liners 24 and 26 relative to mount portions 22. Plate 42 is received longitudinally outwardly of a face of nut 36, and prevents wedge 34 from being forced outwardly of groove 30.

Figure 3:
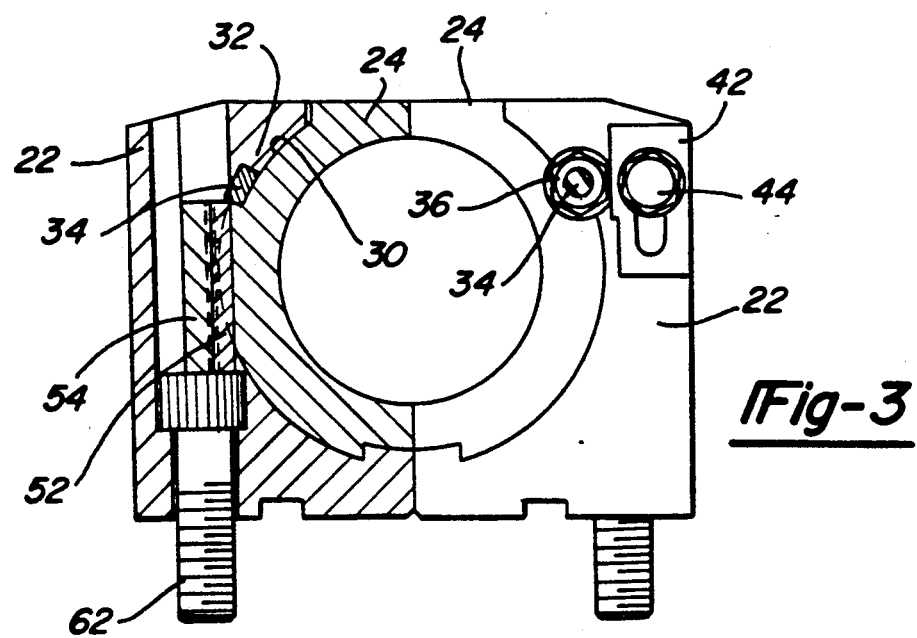
FIG. 3 is a cross-sectional view along line 3—3 as shown in FIG. 2.

As shown in FIG. 3, wedge 34 is received within a clearance between flange 32 and groove 30. Wedge 34 takes up any slack, and insures that liners 24 and 26 are securely mounted within mount portions 22. Plate 42 is received longitudinally outwardly of nut 36, and prevents outward movement of wedge 34.

Figure 4:
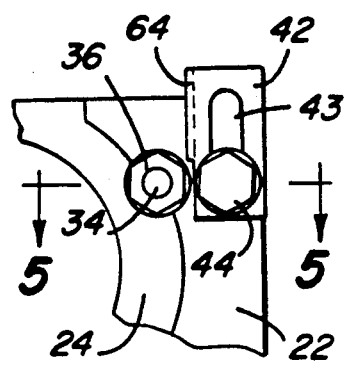
FIG. 4 is a partial enlarged view of a portion of the view shown in FIG. 3.

As shown in FIG. 4, plate 42 is initially positioned vertically above the face of nut 36. Once liner 24 is properly positioned on mount portion 22, nut 36 is mounted on wedge 34, and wedge 34 is forced into groove 30. Once wedge 34 is in groove 30, plate 42 is moved downwardly relative with bolt 44 moving in slot 43. A channel 64 in plate 42 overlies and locks nut 36 against an end face 28 of liners 24 and 26.

Figure 5:
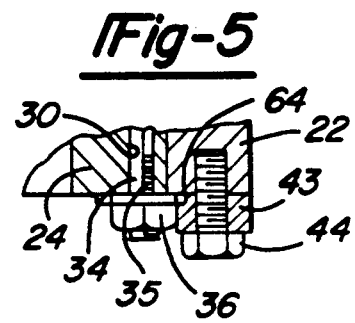
FIG. 5 is a view along line 5—5 as shown in FIG. 4.

As shown in FIG. 5, in a method of initially setting up wedge 34, wedge 34 is forced into groove until a predetermined force is required to force it further into groove 30. At that time, it is assumed that wedge 34 is relatively tightly received within notch 30. Wedge 34 has a greater cross-sectional area at an end adjacent nut 36 than it does at locations longitudinally inwardly of this end.

Figure 6:
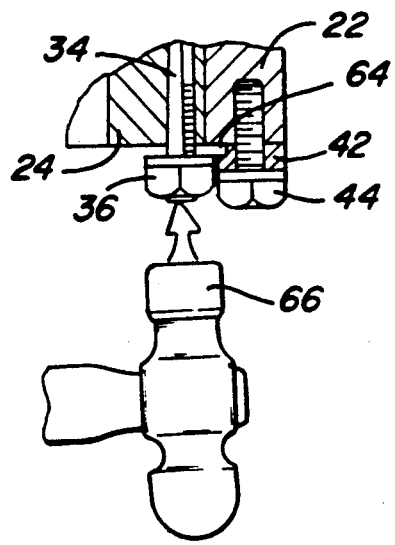
FIG. 6 is a view similar to FIG. 5.

Once wedge 34 is relatively tightly received in groove 30, nut 36 is loosened by a predetermined number of turns. As an example, nut 36 may be removed two turns to the position shown in FIG. 6. A force is then directed against the end of wedge 34. As shown, hammer 66 may be used to direct a force against wedge 34. This forces wedge 34 further into notch 30 until nut 36 abuts an end face, stopping further movement and locking wedge 34, and consequently liners 24 and 26 within mount portion 22. With nut 36 against end face 28 of liner 26, plate 42 is brought downwardly such that channel 64 secures nut 36 against end face 28.

Figure 7:
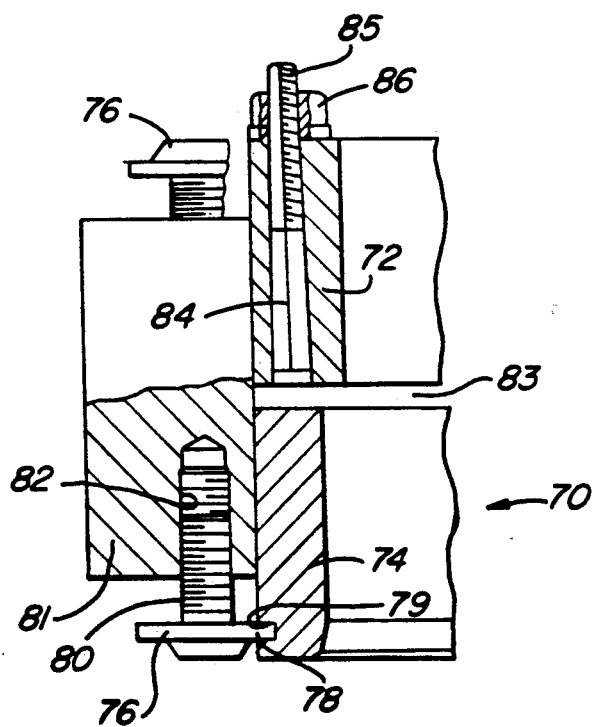
FIG. 7 is a top view of a second embodiment of the present invention.

A second embodiment of the present invention is disclosed in FIG. 7. In the second embodiment, a threaded adjustment member replaces the serrated members utilized in the first embodiment. As shown, second embodiment 70 includes liners 72 and 74 which are adjusted by a threaded bolt 76 having a radially outwardly extending head 78 received in a channel 79 in liners 72 and 74. Bolt 76 has threads 80 at an outer peripheral surface which are received in a threaded bore 82 in mount portion 81. Bolt 76 is turned relative to bore 82, and radially outer portion 78 turns within channel 79. As bolt 76 moves longitudinally towards mount portion 81, liner 74 is moved towards central slot 83. In this way, the liner 74 can be accurately moved to any one of an infinite number of positions relative to slot 83.

A wedge 84 used in the second embodiment is distinct from that shown with the first embodiment, in that it is tapered in an opposed direction. A nut 86 is received on threads 85 of wedge 84. Wedge 84 has a smaller cross-sectional are a adjacent nut 86 than it does adjacent slot 83. Once bolt 76 has moved liner 74 to a desired position, nut 86 is tightened on wedge 84. This draws wedge 84 longitudinally outwardly towards nut 86. It should be understood the wedge 84 is received in a similar groove 30 as that utilized with the first embodiment. In this way, the greater cross-sectional area portions of wedge 84 are drawn further into groove 30 and lock liners 72 and 74 to mount portion 81. Further, when a force is directed from a blade moving though slot 83 longitudinally into liners 72 and 74, it will force wedge 84 further into groove 30. Also, an element such as a screw may be inserted through an opening in the mount to engage the threads on bolt 76 and prevent further rotation.

FIG. 8 shows a third embodiment adjustment assembly 85 of the present invention which is somewhat similar to that shown in FIG. 7. In adjustment assembly 85, a nut 88 is adjustable on a stud 92. A locking nut 90 holds nut 88 at a desired position relative to stud 92. Nut 88 has a groove 104 at one longitudinal location, and a radially outer portion 106 at a position spaced longitudinally towards mount portion 81 from groove 104. Portion 106 is received within a channel in a liner 102.

Stud 92 has a threaded outer periphery 108 which leads to a radially inwardly extending shoulder 110, which abuts an end face of mount portion 81 to define a proper position of stud 92 relative to mount portion 81. An inner portion 112 of stud 92 is received within a bore 114 to secure stud 92 to mount portion 81. Inner portion 112 includes a pair of circumferentially-spaced slots 116 which define two subportions 117 of inner portion 112. A wedge-shaped expander 118 is received in a central bore 119 in stud 92, and forces subportions 117 radially outwardly to lock stud 92 within bore 114.

In order to advance liners 102 towards and away from blade 100, one turns nut 88 on stud 92. Liners 102 then move longitudinally to a desired position. Once at the desired position, lock nut 90 is moved onto stud 92 to hold nut 88 at the desired position, and expander 118 is moved into central bore 119 to lock stud 92 within mount portion 81. A wedge 84 and nut 86 similar to that used with the second embodiment are also used to lock liner 102 to mount portion 81.

As shown in FIG. 9, wedge 84 secures liner 102 relative to mount portion 81 similar to the second embodiment. Portion 106 of nut 88 is received within a channel in liner 102, and moves liner 102 towards and away from blade 100.

As shown in FIG. 10, channel 120 formed in liner 102 receives portion 106, while groove 104 in nut 88 receives a corresponding portion of liner 102. Thus, when nut 88 is turned relative to stud 92, liner 102 moves longitudinally relative to mount 81.

Figure 11:
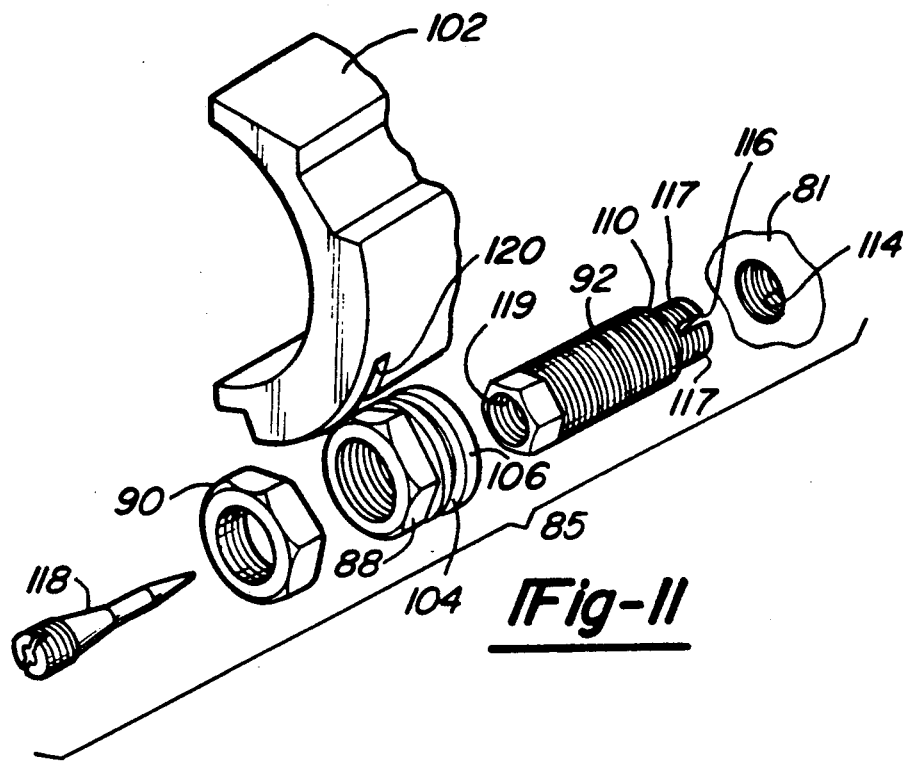
FIG. 11 is an exploded view of a portion of the third embodiment of the present invention.

The details of adjustment assembly 85 are shown in exploded view of FIG. 11. loner 102 has channel 120 at a rear face, and at a longitudinal position adjacent an end face of liner 102. Spreader 118 is received within bore 119, and subportions 117 are spaced by slots 116 and expand within bore 114 of mount portion 81. Stud 92 has wrench flats at a longitudinal position removed from liner 102 for mounting of stud 92 to mount portion 81. Nut 88 has groove 104 and portion 106 for moving liner 102.

Figure 12:
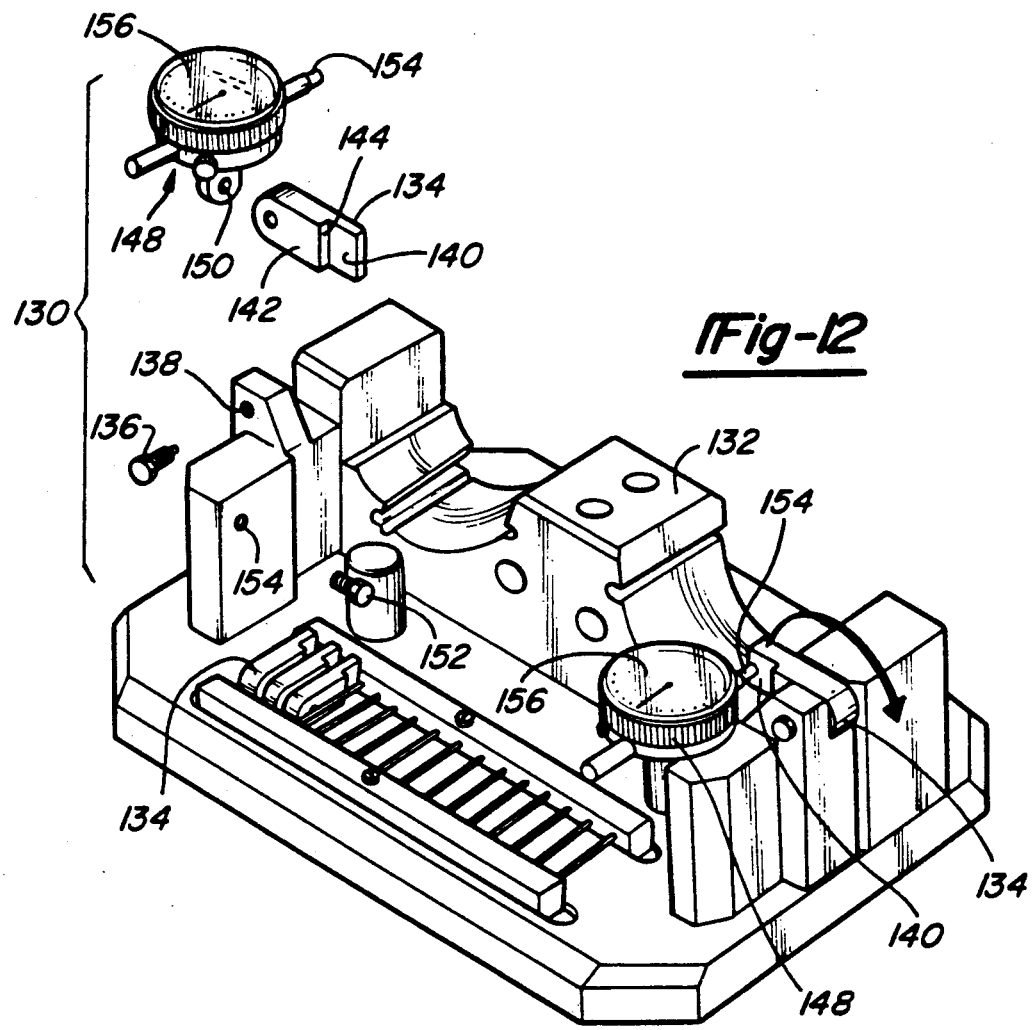
FIG. 12 is a perspective view of a set-up rig according to the present invention.

A set-up rig 130 is illustrated in FIG. 12. Set-up rig 130 includes a model mount portion 132 which approximates the structure and shape of a machine with which the liner to be set-up will be utilized. A part 134 is pivotally attached to rig 130 through a pin 136 received in hole 138. Part 134 is chosen such that a ledge end face 140 is spaced from a nominal end face 142 by an extension portion 144 which approximates the thickness of a blade with which the particular liner to be adjusted will be utilized. A number of parts 134 are stored on set-up rig 130 such that the proper sized part can be selected to approximate the blade for a particular machine.

A gauge 148 is positioned adjacent part 134, with a bolt 152 securing gauge 148 to set-up rig 130. Gauge 148 has a probe 154 which is biased outwardly until it abuts ledge end face 140. The gauge dial 156 is then moved to zero, such that a zero indication on the dial indicates that probe 154 is in abutting contact with ledge end face 140, or at an equivalent position. Since part 134 approximates the thickness of a blade which is to be utilized with the particular liner, probe 154 is now in set to a reference location which approximates the end face of a blade which is to be utilized with the particular liner. Part 134 is then pivoted outwardly away from gauge probe 154, and probe 154 is biased outwardly such that dial 156 no longer reads zero.

Figure 13:
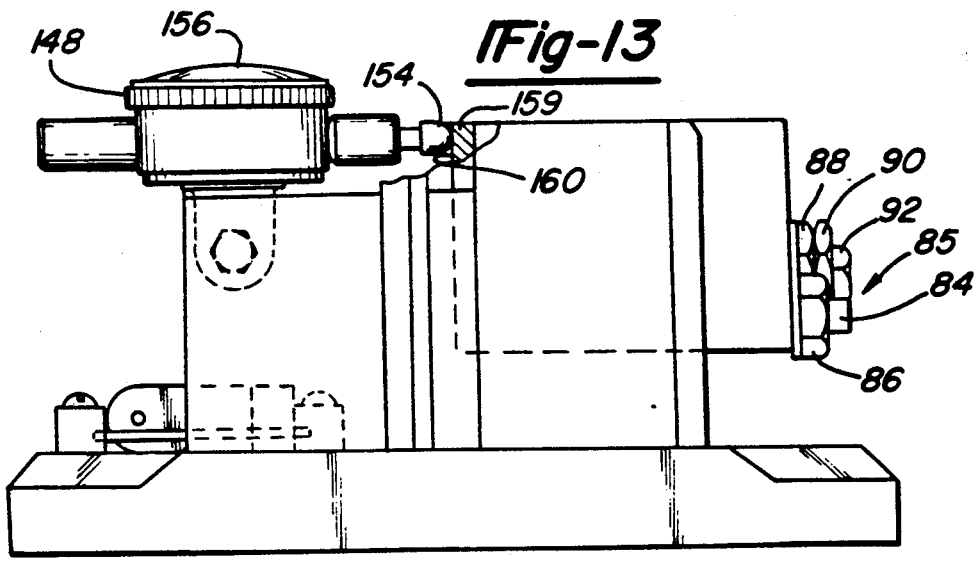
FIG. 13 is a side view of the set-up rig illustrated in FIG. 12.

As shown in FIG. 13, a liner 159 is then moved towards probe 154, until an end face 166 abuts probe 154. Movement of liner 159 is accomplished by turning a nut 88 on a stud 92 which is mounted within model mount portion 132.

As shown in FIG. 14, a wedge 84 and nut 86 may be used, however, they would not be tightened at this point in time. If used, the wedge will be loosely received in the groove such that liner 159 would be able to move, but would be prevented from undue rotation relative to model mount structure 132. Alternatively, the flange utilized on model mount structure 132 to correspond to groove 30 may be selected such that it fully corresponds to the shape of groove 30. In this way, the model mount structure 132 would fully support liner 159 during this adjustment without a wedge element.

As shown in FIG. 15, part 134 is used to zero gauge dial 156. Thus, a zero indication on gauge dial 156 indicates that probe 154 is in a position such that it approximates the end face of a blade. Part 134 is then pivoted outwardly, away from gauge 148 allowing liner to contact probe 154.

As shown in FIG. 16, liner 159 is moved such that its end face 160 moves probe 154 to a position where gauge dial 156 again reads zero. This would indicate that end face 160 is now in a position such that it would abut an end face of the blade with which the liner is to be used. Further, nut 88 has been turned on stud 92 to move liner 159 to this location. If the relative positions of nut 88 and stud 92 are repeated on an actual cutting machine, liner 159 would be moved back to this position.

Once liner 159 is in the position such that end face 160 has moved gauge dial 156 to zero, the liner is then moved away by reversing nut 88 on stud 92 to a second position 164 such that end face 160 allows gauge 154 to move away from the reference position where gauge dial 156 is at zero, to a position shown in phantom at 166 where the dial indicator shows a negative reading. This negative reading is selected such that it is equal to a desired clearance between the end of the blade and the end 160 of liner 159. Lock nut 90 then is used to fix nut 88 at the desired location.

Due to the use of part 134 and gauge 148, it is assured that end face 160 is now properly positioned relative to the end face of a blade that is found on the tool with which the liner is to be used. This set-up is preferably done in a controlled environment without time constraints by a skilled technician, rather than on the machine floor by a machine worker. The skilled technician can ensure proper set-up of the liner 159, and thus more accurately positioned.

As shown in FIG. 17, once liner 159 is in the proper position, stud 92 is removed from set-up rig 130. In initially setting up liner 156 on set-up rig 130, spreader 118 is preferably not fully inserted into stud 92. The entire adjustment assembly 85, other than spreader 118, is removed by removing stud 92 from the bore in the set-up rig. The liner 159 is then attached to a machine at the proper location by inserting stud 92 into the bore 114 in the mount portion 81 for the machine until shoulder 110 abuts an end face of mount portion 81. Nut 88 and lock nut 90 are left at the position set on set-up rig 130, such that liner 159 is now at the proper position relative to mount portion 81. In this way, the liner 159 is transferred from the set-up rig 130 to the cutting machine at a proper location for the particular blade. Spreader 118 is then inserted into stud 92 as described above. The wedges are also then used to secure the liner to mount portion 81.

Figure 18:
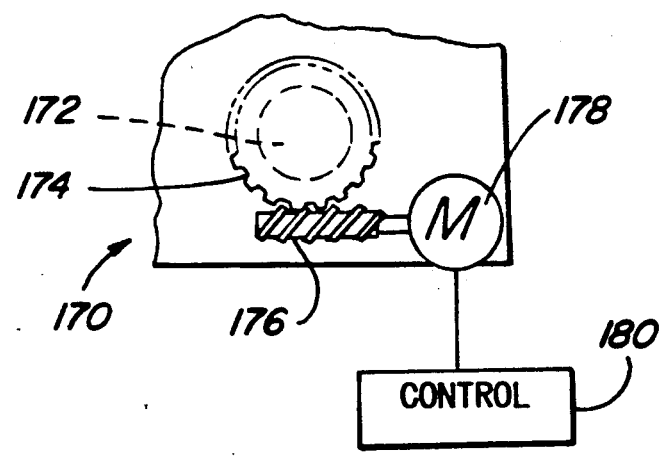
FIG. 18 is a schematic view of an automatic control for properly positioning a liner.

In a further feature according to the present invention, an automatic set-up structure 170 may be utilized as illustrated in FIG. 18. Nut 88 is replaced with a nut 172 having gear teeth 174 at an outer periphery. A gear 176 engages teeth 174 and is driven by a motor 178 to rotate nut 172, and advance a liner in a manner similar to that described above. A control 180 controls motor 178. It is envisioned that a sensor may be mounted in the mount portion and would monitor a fixed reference point, and compare that fixed reference point to a reference point on the liner to achieve a desired position for the liner. The use of the gauge as described in the set-up rig can be eliminated by this computer control. Also, the gauge could be an electronic element tied into the motor control. Further, this computer control can be utilized on the machine rather than in a remote location, as it will ensure rapid, accurate positioning.

Although the disclosed embodiments have each used the locking elements in combination with positioning members, it is envisioned that the locking elements could fully secure the liners without any additional structure. Further, as an alternative to the flanges and locking elements, an arrangement is envisioned wherein the mount body is flexible, and is deformed downwardly by a bolt to lock the liner to the mount portion. The flexibility may be achieved by cutting a slot through the mount body. Alternatively, the mount body could have a removable top portion that is forced downwardly by a bolt to lock the liner relative to the mount body.

Several preferred embodiments of the present invention have been disclosed, however, a worker of ordinary skill in the art would recognize that certain modifications come within the scope of this invention. For that reason the following claims should be studied in order to determine the true scope and content of this invention

I claim:

1. An assembly comprising:
   a clamp having at least one body and one liner, said liner having a longitudinally extending rear face supported on said body, and a longitudinally extending forward face for holding a part to be clamped;
   a cutting element movable adjacent to one longitudinal end face of said liner; and
   a threaded member having a radially outer portion received in a channel in said rear face of said liner, said threaded member being movable longitudinally relative to said body, with said radially outer portion rotating within said channel in said rear face, and causing said liner to move longitudinally, such that said liner is longitudinally adjusted to any one of a plurality of longitudinal positions relative to said body towards and away from said cutting element to control the clearance between said one longitudinal end face of said liner and said cutting element.

2. A clamp as recited in claim 1, wherein said threaded member is a bolt which is turned within a bore in said body, with said radially outer portion of said bolt received in said channel of said liner and causing said liner to move longitudinally as said bolt is turned relative to said body.

3. A clamp as recited in claim 2, wherein said threaded member is a nut threadably received on a stud which is fixed in said body, said radially outer portion being on said nut and received in a channel in said liner, such that when said nut is adjusted on said stud, said nut moves longitudinally relative to said body, and said liner is also moved longitudinally relative to said body.

4. A clamp as recited in claim 3, wherein said stud has a first portion of a first relatively small outer diameter and a second portion of a greater outer diameter, and a shoulder extending radially outwardly from an axis of said stud to define the beginning of said second portion, and said shoulder abutting an end face of said body to define a stop position for said stud.

5. A clamp as recited in claim 4, wherein a lock nut is positioned on said stud on a side of said nut removed from said body, said lock nut holding said nut at a desired longitudinal position to lock said liner at a desired longitudinal position.

6. A clamp as recited in claim 3, wherein said stud has a central bore, and an expander is turned into said central bore to lock said stud within said body.

7. A clamp as recited in claim 6, wherein said stud has a first portion of a relatively small outer diameter and a second portion of a greater outer diameter, and a shoulder extending radially outwardly from an axis of said stud to define the beginning of said second portion, and said shoulder abutting an end face of said body to define a stop position for said stud.

8. A clamp as recited in claim 7, wherein said first portion has at least a pair of opposed slots such that said first portion is separated into at least two circumferential-spaced portions, and said expander forces said circumferential portions radially outwardly to lock said stud within said body.

9. A clamp as recited in claim 1, wherein said liner has a groove, and said body has at least one corresponding flange, said flange extending for a smaller circumferential dimension than said groove, a wedge being inserted in said groove to lock said liner relative to said body.

10. A clamp as recited in claim 9, wherein said wedge extends beyond a first end of aid liner adjacent to an end face where said threaded member is located, said wedge having threads at an outer periphery and receiving a wedge nut, such that said wedge nut may be turned on said wedge, and against an end face of said body to pull said wedge outwardly of said body in a direction towards said first end face, said wedge having a relatively small cross-section area adjacent said first end face, and having a greater cross-sectional area at a location adjacent a second longitudinal end of said liner such that when said wedge is pulled towards said first end, said greater area is forced into said groove, locking said liner relative to said body.

11. A clamp comprising:
   a body and a liner, said liner having a longitudinally extending rear face supported on said body, and a longitudinally extending forward face for holding a part to be clamped;
   a threaded member having a radially outer portion received in a channel in said rear face of said liner, said threaded member being movable longitudinally relative to said body, with said radially outer portion rotating within said channel in said rear face, and causing said liner to move longitudinally, such that said liner may be longitudinally adjusted to any one of a plurality of longitudinal positions relative to said body; and
   said threaded member is a nut threadably received on a stud which is fixed in said body, said radially outer portion being on said nut and received in a channel in said liner, such that when said nut is adjusted on said stud, said nut moves longitudinally relative to said body, and said liner is also moved longitudinally relative to said body.

12. A clamp comprising:
   a pair of spaced mount bodies, each of said mount bodies supporting a rear face of a liner, said mount bodies being movable towards each other to a clamping position where said liners are relatively adjacent each other for clamping a part, and away from each other to an unclamped position where said liners are relatively spaced from each other; and a stud received in each said mount body, a nut being received on threads at an outer periphery of said stud, said nut having a radially outer portion received in a channel in said liner, such that said nut may be rotated upon said stud to cause said liner to move parallel to the axis of said stud to a desired longitudinal position.

13. A clamp as recited in claim 12, wherein a cutting element is movable adjacent to one longitudinal end face of said liners, and said liners are longitudinally adjusted to control the clearance between said one longitudinal end face of said liners and said cutting element.

14. A clamp as recited in claim 12, wherein a lock element is received on said stud to fix said nut at a desired position.

15. A clamp is recited in claim 14, wherein said lock element is a lock nut positioned on said stud on a side of said nut removed from said body, said lock nut fixing said nut at a desired longitudinal position to lock said liner at a desired longitudinal position.

16. A clamp as recited in claim 12, wherein said stud has a first portion of a relatively small outer diameter and a second portion of a greater outer diameter, and a shoulder extending radially outwardly from an axis of said stud to define the beginning of said second portion, and said shoulder abutting an end face of said body top define a stop position for said stud.

17. A clamp as recited in claim 16, wherein said stud has a central bore, and an expander is turned into said central bore to lock said stud within said body.

* * * * *